(12) United States Patent
Yoshitake et al.

(10) Patent No.: US 10,173,901 B2
(45) Date of Patent: Jan. 8, 2019

(54) SILICA PARTICLES, MANUFACTURING METHOD FOR THE SAME, AND SILICA SOL

(71) Applicant: NISSAN CHEMICAL INDUSTRIES, LTD., Tokyo (JP)

(72) Inventors: Keiko Yoshitake, Sodegaura (JP); Ai Umeda, Sodegaura (JP); Ichitaro Kikunaga, Tokyo (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/101,154

(22) PCT Filed: Dec. 11, 2014

(86) PCT No.: PCT/JP2014/082817
§ 371 (c)(1),
(2) Date: Jun. 2, 2016

(87) PCT Pub. No.: WO2015/087965
PCT Pub. Date: Jun. 18, 2015

(65) Prior Publication Data
US 2017/0001870 A1 Jan. 5, 2017

(30) Foreign Application Priority Data
Dec. 12, 2013 (JP) ................................. 2013-257440

(51) Int. Cl.
*C01B 33/141* (2006.01)
*C01B 33/18* (2006.01)
*C01B 33/145* (2006.01)

(52) U.S. Cl.
CPC ........ *C01B 33/1417* (2013.01); *C01B 33/145* (2013.01); *C01B 33/18* (2013.01);
(Continued)

(58) Field of Classification Search
CPC .... C01B 33/1417; C01B 33/145; C01B 33/18
See application file for complete search history.

(56) References Cited

U.S. PATENT DOCUMENTS 6,083,314 A 7/2000 Nakashima et al.
6,455,154 B1 9/2002 Nakashima et al.
(Continued)

FOREIGN PATENT DOCUMENTS

JP H06-227809 A 8/1994
JP H10-279328 A 10/1998
(Continued)

OTHER PUBLICATIONS

Machine translation JP 2008-137854. (2008).*
(Continued)

*Primary Examiner* — Alexandre F Ferre
(74) *Attorney, Agent, or Firm* — Oliff PLC (57) ABSTRACT

The invention provides silica particles, formed from an alkoxysilane serving as a raw material, characterized in that the silica particles satisfy the following requirements (a) to (c): (a) the silica particles have an alkali metal element content of 5 ppm or less, with respect to the silica solid content; (b) the silica particles exhibit a moisture absorption of 0.25 mg/m$^2$ or less at 50% relative humidity, and a refractive index, as determined through the liquid immersion method, of 1.450 to 1.460; and (c) the silica particles have a mean primary particle size, derived from a specific surface area as determined through the nitrogen adsorption method, of 10 to 100 nm.

7 Claims, 1 Drawing Sheet

(52) U.S. Cl.
CPC ...... *C01P 2004/04* (2013.01); *C01P 2004/54* (2013.01); *C01P 2004/64* (2013.01); *C01P 2006/80* (2013.01)

(56) References Cited

U.S. PATENT DOCUMENTS

2006/0269733 A1* 11/2006 Mizuno .................... C09D 4/00
                                                    428/304.4
2011/0281974 A1* 11/2011 Suemura ............... B82Y 30/00
                                                    523/456

FOREIGN PATENT DOCUMENTS

| JP | H11-61043 A | | 3/1999 |
|----|---|---|---|
| JP | 2008137854 A | * | 6/2008 |
| JP | 2008-297183 A | | 12/2008 |
| JP | 2009-234854 A | | 10/2009 |
| JP | 2010-032996 A | | 2/2010 |
| JP | 2010-083744 A | | 4/2010 |
| JP | 2012-111869 A | | 6/2012 |
| JP | 5 348400 B2 | | 11/2013 |

OTHER PUBLICATIONS

Stöber et al; "Controlled Growth of Monodisperse Silica Spheres in the Micron Size Range;" Journal of Colloid and Interface Science; 1968; vol. 26; pp. 62-69.

Apr. 7, 2015 Search Report issued in International Patent Application No. PCT/JP2014/082817.

May 12, 2017 Search Report issued in European Patent Application No. 14870123.8.

* cited by examiner

SILICA PARTICLES, MANUFACTURING METHOD FOR THE SAME, AND SILICA SOL

TECHNICAL FIELD

The present invention relates to silica particles, to a method for producing the silica particles (hereinafter the method may be also referred to as a "silica particle production method"), and to a silica sol.

BACKGROUND ART

Hitherto, there has been known a method for producing silica sol through neutralization or ion-exchange of water glass serving as a raw material. Also, it has been known that silica micropowder is produced through pyrolysis of silicon tetrachloride. A known method for producing a high-purity silica sol is based on hydrolysis of an alkoxysilane in an alcoholic aqueous solution in the presence of a basic catalyst. In one reported method, a 0.28 mol/L tetraethyl silicate is added to an alcoholic solution containing several mol/L-order ammonia and several mol/L to 15 mol/L water, and the mixture is hydrolyzed, to thereby obtain silica particles having a diameter of 50 to 900 nm (see, for example, Non-Patent Document 1).

In one proposed method for producing a dispersion of silica particles, an untreated silica material having a Q4/Q3 value of 0.5 to 5.0 is subjected to a hydrothermal treatment, wherein Q3 is a peak signal area in an $^{29}$Si-NMR spectrum observed in a chemical shift of −94 ppm to −103 ppm, and Q4 is a peak signal area in a $^{29}$Si-NMR spectrum observed in a chemical shift of −103 ppm to −115 ppm (see, for example, Patent Document 1). The untreated silica material employed in the Examples of Patent Document 1 has a dispersion particle size (a median size as determined through a dynamic light scattering method) of 58 nm and a mean particle size as determined through TEM observation of 44 nm.

In one proposed method for producing silica hollow particles, silicic acid or a silicate salt is hydrolyzed to condensate in the presence of a basic catalyst, to thereby form a silica coating layer on core particles such as calcium carbonate particles, and the silica coating layer is subjected to a hydrothermal treatment (see, for example, Patent Document 2).

There has been proposed a method for producing a silica sol for use as an abrasive, wherein a raw material is subjected to a hydrothermal treatment in the presence of an alkaline species such as NaOH, KOH, or a quaternary ammonium (see, for example, Patent Document 3).

PRIOR ART DOCUMENTS

Patent Documents

[Patent Document 1] Japanese Patent Publication Laid-Open (kokai) No. 2010-83744
[Patent Document 2] Japanese Patent Publication Laid-Open (kokai) No. 2009-234854
[Patent Document 3] Japanese Patent Publication Laid-Open (kokai) No. 2012-111869

Non-Patent Documents

Non-Patent Document 1: Journal of Colloid and Interface Science, Vol. 26 (1968), p. 62 to 69

SUMMARY OF THE INVENTION

Problems to be Solved by the Invention

However, when the method for producing silica sol through neutralization or ion-exchange of water glass serving as a raw material is employed, impurities such as metals cannot be completely removed. In the silicon tetrachloride pyrolysis technique, the resultant silica micropowder is formed of aggregated particles, which impede formation of a monodispersion silica sol even through dispersing the particles in water or the like. Furthermore, when chloride ions remain as an impurity, the purity of silica sol decreases. As a result, the formed silica sol cannot find specific uses where high purity is required.

When the method disclosed in Non-Patent Document 1 is employed, a large number of unhydrolyzed alkoxyl groups remain inside the formed silica particles, and alcohol is released from the silica particles via heating or hydrolysis. Thus, difficulty is encountered in formation of high-density silica particles and in production of a silica sol having excellent moisture absorption resistance. In another case, after elimination of alkoxyl groups via hydrolysis, pores or silanol groups may remain inside the silica particles, under certain conditions. Thus, when such silica particles are used as a filler for resin, the characteristics of the resin may be impaired.

When the method disclosed in Patent Document 1 is employed, the apparent particle size of the silica particles is substantially unchanged even after thermal treatment. Consequently, silica particles are densified only in their shell portions. Thus, the resultant silica particles are porous in the inside thereof, thereby failing to produce silica particles having excellent moisture absorption resistance.

In the method disclosed in Patent Document 2, acid-soluble microparticles are placed in a hydrolysis-condensation system including silicic acid or a silicate salt, to thereby form a silica coating layer on the surfaces of the microparticles, and then cores of the microparticles are removed. Due to this production concept, densified silica particles cannot be produced, failing to form silica having excellent moisture absorption resistance.

In the method disclosed in Patent Document 3, an alkali silicate is used as a raw material, and an alkaline species such as NaOH, KOH, or a quaternary ammonium salt is added thereto. Thus, the alkaline species is readily incorporated into the silica particles, and difficulty is encountered in removing the thus-incorporated alkaline species from the inside of the particles. Thus, high-purity silica particles having high density cannot be produced.

In view of the foregoing, an object of the present invention is to provide high-purity silica particles having high density and excellent moisture absorption resistance. Another object is to provide a method for producing the silica particles. Still another object is to provide a silica sol containing the silica particles.

Means for Solving the Problems

In one mode of the present invention to solve the aforementioned problems, there are provided silica particles, formed from an alkoxysilane serving as a raw material, characterized in that the silica particles satisfy the following requirements (a) to (c):

(a) the silica particles have an alkali metal element content of 5 ppm or less, with respect to the silica solid content;

(b) the silica particles exhibit a moisture absorption of 0.25 mg/m² or less at 50% relative humidity, and a refractive index, as determined through the liquid immersion method, of 1.450 to 1.460; and (c) the silica particles have a mean primary particle size, derived from a specific surface area as determined through the nitrogen adsorption method, of 10 to 100 nm.

Preferably, the silica particles have an aspect ratio, as determined from a transmission electron microscopic photoimage, of 1.0 to 2.0. Notably, when the aspect ratio of a particle is close to 1, the particle is spherical.

In another mode of the present invention to solve the aforementioned problems, there is provided a method for producing silica particles, characterized in that the method comprising the following steps (A) and (B):

(A) a step of hydrolyzing an alkoxysilane in the co-presence of at least one base selected from the group consisting of ammonia, a primary amine, a secondary amine, and a cyclic tertiary amine, to thereby form an aqueous dispersion of silica particles having a mean primary particle size, derived from a specific surface area as determined through the nitrogen adsorption method, of 3 to 20 nm; and (B) a step of subjecting the aqueous dispersion of silica particles to a hydrothermal treatment at 150 to 350° C.

Preferably, before carrying out the hydrothermal treatment in step (B), the amount of at least one base selected from the group consisting of ammonia, a primary amine, a secondary amine, and a cyclic tertiary amine in the aqueous dispersion of silica particles having a mean primary particle size of 3 to 20 nm is adjusted to 0.002 to 0.20 as a mole ratio (base/SiO$_2$).

In still another mode of the present invention to solve the aforementioned problems, there is provided a silica sol characterized by containing the silica particles.

Effects of the Invention

The present invention enables provision of high-purity silica particles having high density and excellent moisture absorption resistance, a method for producing the silica particles, and a silica sol containing the silica particles.

MODES FOR CARRYING OUT THE INVENTION

The silica particles of an embodiment of the present invention are formed from an alkoxysilane serving as a raw material, and are characterized in that the silica particles satisfy the following requirements (a) to (c):

(a) the silica particles have an alkali metal element content of 5 ppm or less, with respect to the silica solid content;

(b) the silica particles exhibit a moisture absorption of 0.25 mg/m² or less at 50% relative humidity, and a refractive index, as determined through the liquid immersion method, of 1.450 to 1.460; and (c) the silica particles have a mean primary particle size, derived from a specific surface area as determined through the nitrogen adsorption method, of 10 to 100 nm.

The silica particles of this embodiment will next be described in detail.

In the embodiment, an alkoxysilane is employed as a raw material. Therefore, as compared with a conventional method employing water glass as a raw material, high-purity silica particles can be more easily produced. In other words, in a conventional method employing water glass as a natural raw material, metallic impurities originating from the raw material remain in silica particles, whereby difficulty is encountered in producing high-purity silica particles. In addition, an additional process of removing such a metallic impurity may be performed. In contrast, according to the present embodiment, contamination with the aforementioned metallic impurities can be avoided, and an additional process of removing such impurities can be eliminated.

That is, the method of the embodiment employing an alkoxysilane serving as a raw material contains substantially no metallic species which may possibly serve as a metallic impurity, which has ever been employed in conventional methods employing water glass as a raw material. Examples of the metallic species include sodium, iron, and aluminum. The metallic species is typically an alkali metal element such as sodium. Notably, the expression "substantially containing" means 5 ppm or less with respect to the solid content of silica.

In other words, the present embodiment essentially satisfies the requirement (a) that the alkali metal element content, with respect to the silica solid content, is 5 ppm or less. The alkali metal element is not necessarily limited to sodium, and a plurality of alkali metal elements may be included. However, the total alkali metal element amount must be 5 ppm or less, with respect to the silica solid content.

In the above embodiment, an alkoxysilane is employed as a raw material, whereby high-purity silica particles can be readily formed. Therefore, the silica particles of the embodiment can be applied to various uses, in particular, to electronic material uses, where high purity is required. In addition, since the silica particles have excellent moisture absorption resistance, there may be prevented impairment in moisture absorption resistance of a resin containing a large amount of the silica particles as a filler.

Meanwhile, in order to produce high-purity silica particles, other conventional techniques, where silica particles are grown via vapor phase reaction employing a high-purity silicon compound as a raw material, may be generally more advantageous than the aforementioned conventional technique employing water glass. However, such conventional techniques require a firing step. In the firing step, silica particles aggregate again, thereby impairing dispersibility. As a result, a monodispersed silica sol fails to be produced, even when the silica particles are dispersed in a medium such as water. In contrast to the present embodiment, such silica particles cannot be readily applied to various uses. Particularly, such silica particles are not suited for a case where the particles are added to a resin in a large amount.

From the viewpoints of solubility in a medium, availability, etc., the alkoxysilane may be an alkyl ester of a silicic acid monomer or a silicic acid oligomer (n=2 or 3), the ester having a C1 or C2 alkyl group. Examples of preferably used alkoxysilanes include tetramethyl silicate (TMOS), tetraethyl silicate (TEOS), methyltriethyl silicate, dimethyldiethyl silicate, trimethylethyl silicate, and a trialkyl silicate having a C1 or C2 alkyl group.

These alkoxysilanes may be used singly or in combination of two or more species. Alternatively, there may also be used a mixed-ester alkoxysilane having different alkyl groups in the molecule thereof, or a mixture of such esters.

Next, the present embodiment satisfies requirement (b): the silica particles exhibit a moisture absorption of 0.25 mg/m² or less at 50% relative humidity, and a refractive index, as determined through the liquid immersion method, of 1.450 to 1.460.

When the moisture absorption at 50% relative humidity is in excess of the upper limit of the range, the silica particles have low density and poor moisture absorption resistance. Thus, when the silica particles are incorporated into a resin composite material or the like, the moisture absorption resistance of the resin composite material tends to decrease.

The moisture absorption amount of requirement (b) corresponds to a water adsorption amount per unit surface area of the silica particles, and may be determined through, for example, a procedure described in the Examples. The moisture absorption amount does not reflect adsorption of water on the portions of silica particles other than the cores of the particles. That is, the effect of particle size can be excluded. In other words, the moisture absorption amount of requirement (b) can serve as an index for water absorption inside the particles.

However, the moisture absorption amount is determined under the assumptions that the absorbed water completely enters the particles, that one or two layers of adsorbed water molecules are formed on the surfaces of the particles, and that other specific conditions are satisfied. Depending on properties of particles, water adsorbed in the cores of silica particles may fail to be detected completely in the measurement of moisture absorption amount. Specifically, even though a particle has a porous core, when the particle has a dense shell, permeation of water vapor into the core is retarded. In such a case, the silica particles may fail to be evaluated only through measurement of the moisture absorption amount. Therefore, in requirement (b), the refractive index as determined through the liquid immersion method is limited to 1.450 to 1.460, in addition to the limitation on the moisture absorption amount. The higher the refractive index, the more dense the particles. Thus, according to requirement (b), the hygroscopic property of the cores of the silica particles, a particle can be evaluated not only by the moisture absorption amount, but also by the refractive index as determined through the liquid immersion method. The refractive index may be determined through, for example, a procedure described in the Examples.

The aforementioned moisture absorption amount and refractive index are able to evaluate the density characteristics of the silica particle core, and two properties are correlated to each other to a certain extent. However, since the aforementioned moisture absorption amount is determined, assuming that the aforementioned specific conditions are satisfied, the correlation is not perfect. Thus, in the case where both of the moisture absorption amount and the refractive index are satisfied, requirement (b) is satisfied. However, in the case where at least one of the moisture absorption amount and the refractive index is not satisfied, requirement (b) is not satisfied.

When the refractive index as determined through the liquid immersion method falls within the above range, the silica particles are evaluated to have high density and excellent moisture absorption resistance. When such silica particles are incorporated into a resin composite material or the like, the particles do not have less effect on the moisture absorption resistance of the resin composite material.

In the present invention, the refractive index is determined based on the phenomenon that particles forming a dry powder immersed in liquid have transparent appearance when the refractive index of the particles is equal to that of the liquid. No particular limitation is imposed on the refractive index determination method. In the Examples, the refractive index was determined through the following simple procedure. Specifically, two organic solvents are mixed at a ratio so as to adjust the refractive index thereof to the refractive index of the sample, and the refractive index of the liquid mixture is measured by means of an Abbe's refractometer.

Furthermore, the present embodiments satisfy requirement (c): the mean primary particle size derived from a specific surface area as determined through the nitrogen adsorption method is 10 to 100 nm. The specific surface area as determined through the nitrogen adsorption method is a surface area per unit mass of silica particles, and the mean primary particle size is an averaged value of primary particle sizes of silica particles calculated from the specific surface area. The mean primary particle size may be determined through, for example, a procedure described in the Examples.

When the mean primary particle size is in excess of the upper limit of the range, characteristics of nano particles cannot fully be attained. In the case where such silica particles are incorporated into a resin, difficulty is encountered in attaining effects of improving resin properties attributed to incorporation of silica particles. Also, when a sol of the silica particles is incorporated into a resin composite material or the like, transparency of the material may be impaired.

In contrast, when the mean primary particle size is smaller than the lower limit of the range, dispersibility of silica particles in a medium or a resin is impaired, thereby making high-content silica particle incorporation difficult. In addition, moisture absorption on the surfaces of silica particles is promoted. In order to prevent undesired moisture absorption, a surface-modifying organic agent must be used in a large amount.

The mean primary particle size of the produced silica particles varies depending on various factors such as the mean primary particle size of raw silica particles and the extent of particle growth. For producing silica particles having a large mean primary particle size, silica particles having a small mean primary particle size are used as a raw material, and the raw material is subjected to various steps such as increasing silica concentration, elevating reaction temperature, prolonging heating time, and using a catalyst having strong basicity, so as to promote growth of silica particles. In an alternative method, the silica particles produced according to the present invention are added to a raw material, and particles are further grown with the silica particles of the invention as growth nuclei, whereby large silica particles can be formed. In contrast, for producing silica particles having a small mean primary particle size, silica raw material having a virtually uniform particle size is used, and growth of silica particles is suppressed through carrying out appropriate steps.

However, when raw silica particles having a large mean primary particle size are used, in some cases, undissolved particles remain to serve as nuclei in the presence of a certain base, and particle growth is promoted around the remaining nuclei. Therefore, the mean primary particle size of the raw silica particles is preferably tuned in consideration of the type of base, production conditions, and other factors.

As described above, the silica particles of the present embodiment are produced from an alkoxysilane serving as a raw material and satisfy the above requirements (a) to (c). Thus, high-purity silica particles having high density and excellent moisture absorption resistance can be obtained.

Such silica particles can be suitably applied to various uses, such as electronic material uses, where high purity is required.

Notably, the silica particles of the embodiment, which are produced from an alkoxysilane serving as a raw material, may have small amounts of alkoxyl groups originating from the alkoxysilane remaining in the core thereof. Thus, if the total amount of remaining alkoxyl groups originating from the alkoxysilane serving as a raw material is measurable, whether or not the silica particles are produced from the alkoxysilane serving as a raw material can be identified from the total amount.

Preferably, the thus-produced silica particles have an aspect ratio, as determined from a transmission electron microscopic photoimage, of 1.0 to 2.0. Notably, when the aspect ratio of a particle is close to 1, the particle is spherical. Since the produced silica particles are generally spherical, a large amount of the silica particles can be incorporated as a filler into a material, such as a resin.

A known transmission electron microscope (TEM) may be employed. The aspect ratio of a particle may be determined from a longer diameter $D_L$ (the longest size of a particle) and a shorter diameter $D_S$ (the longest line orthogonal to the line corresponding to the longer diameter). The ratio ($D_L/D_S$) is employed as an aspect ratio, and about 300 particles are evaluated. The aspect ratios are arithmetically averaged.

Through use of the aforementioned silica particles, a high-purity silica sol having high density and excellent moisture absorption resistance can be provided. When the silica sol is used in a resin composite material or the like, the moisture absorption resistance of the resin composite is less impaired. In addition, the silica sol can be suitably applied to various uses, for example, to electronic material uses, where high purity is required.

Next will be described the method of the present embodiment for producing silica particles. The production method of the embodiment includes the following steps (A) and (B):

(A) a step of hydrolyzing an alkoxysilane in the co-presence of at least one base selected from the group consisting of ammonia, a primary amine, a secondary amine, and a cyclic tertiary amine, to thereby form an aqueous dispersion of silica particles having a mean primary particle size, derived from a specific surface area as determined through the nitrogen adsorption method, of 3 to 20 nm; and (B) a step of subjecting the aqueous dispersion of silica particles to a hydrothermal treatment at 150 to 350° C.

In the first step of this embodiment (step (A)), an alkoxysilane is hydrolyzed in the co-presence of at least one base selected from the group consisting of ammonia, a primary amine, a secondary amine, and a cyclic tertiary amine, to thereby form an aqueous dispersion of silica particles having a mean primary particle size, derived from a specific surface area as determined through the nitrogen adsorption method, of 3 to 20 nm. The silica particles contained in the aqueous dispersion serve as a starting material of the silica particles satisfying the aforementioned requirements (a) to (c).

The silica particles serving as the starting (raw) material have a relatively small particle size. Specifically, the particle size corresponds to a mean primary particle size of 3 to 20 nm, the mean primary particle size being derived from a specific surface area as determined through the nitrogen adsorption method. When the particle size falls within the range, silica particle dissolution/deposition performance can be enhanced, whereby silica particles can be effectively grown. Moreover, remaining of undissolved particles serving as large nuclei can be avoided. As a result, particle growth around the remaining large nuclei is prevented, whereby silica particles having high density from shell to core of a particle can be yielded.

In the present embodiment, silica particles having a mean primary particle size of 3 to 20 nm are used as a raw material, and silica particles having a mean primary particle size of, for example, 10 to 100 nm can be produced. After production of the target silica particles, the mean primary particle size is principally larger than that of the raw material silica particles. That is, when raw material silica particles having a mean primary particle size of, for example, 20 nm is used, the produced silica particles basically have a mean primary particle size greater than 20 nm.

So long as the gist of the present is not changed, no particular limitation is imposed on density of the silica particles serving as a raw material. When dissolution and deposition of silica particles are sufficiently repeated, the formed silica particles have high density from shell to core of a particle.

The aqueous dispersion may be prepared by use of a liquid mainly containing water. Examples of the water employed for producing the dispersion include pure water or ultrapure water such as ion-exchange water, ultrafiltration water, reverse osmotic water, or distilled water. When a high-purity silica sol which can be used for producing electronic materials is produced, pure water or ultrapure water having very low impurity level is suitably used. However, so long as the gist of the present invention is not changed, no particular limitation is imposed on the water-based liquid, and it may contain a variety of additives or a hydrophilic organic solvent.

Examples of the hydrophilic organic solvent include methanol, ethanol, propanol, isopropanol, butanol, isobutanol, ethylene glycol, acetonitrile, dimethyl sulfoxide, dimethylformamide, dimethylacetamide, acetone, tetrahydrofuran, and diethylene glycol. However, no particular limitation is imposed on the organic solvent, and these hydrophilic organic solvents may be used singly or in combination of two or more species.

As described above, through the alkoxide method, in which an alkoxysilane is hydrolyzed to cause polycondensation, high-purity silica particles can be readily formed. The same alkoxysilanes as described above may be used. The alkoxysilane as is may be used, or may be diluted with organic solvent before addition.

The embodiment of the production method preferably includes a step of adjusting the amount of at least one base selected from the group consisting of ammonia, a primary amine, a secondary amine, and a cyclic tertiary amine in the aqueous dispersion. In this step, the mole ratio of the total amount of added base to the amount of raw material silica sol (base/$SiO_2$) is adjusted to 0.002 to 0.20. Thus, when ammonia or an amine used in hydrolysis of the alkoxysilane in step (A) remains in a sufficient amount in the silica dispersion, no additional base may be used. In contrast, when a basic catalyst is used in an excess amount in step (A), the base level is preferably reduced to an appropriate level or lower. No particular limitation is imposed on the method of reducing base, and distillation, washing via ultrafiltration, ion exchange etc. may be employed.

In the case where the base content of the silica sol obtained in step (A) is small, the mole ratio of the total amount of added base to the amount of raw material silica sol (base/$SiO_2$) is preferably adjusted to 0.002 to 0.20 by use of an additional base. The additional base may be identical to or different from the base employed in step (A). Through adjustment of the base amount, the dissolution/deposition balance of silica particles can be adjusted to suitable particle growth conditions. Particularly in the present embodiment, since the mean primary particle size of the raw material silica particles and the hydrothermal treatment temperature are adjusted to fall within specific ranges, respectively, high-purity silica particles having high density and excellent moisture absorption resistance can be obtained by use of the aforementioned weak base.

Thus, in the present embodiment, no strong base including alkali metal must be used, whereby inclusion of a base (e.g., alkali metal) into particles can be avoided. When the alkali metal element content, with respect to the silica solid content, is 5 ppm or less, requirement (a) can be readily satisfied.

The basic catalyst which can be used in step (A) is ammonia, a primary amine, a secondary amine, or a cyclic tertiary amine. Examples of the primary amine include aliphatic amines such as methylamine, ethylamine, propylamine, isopropylamine, butylamine, isobutylamine, sec-butylamine, tert-butylamine, pentylamine, hexylamine, aminocyclohexane, methoxyethylamine, ethoxyethylamine, 3-methoxypropylamine, 3-ethoxypropylamine, ethylenediamine, hexamethylenediamine, N,N-dimethylethylenediamine, 3-(diethylamino)propylamine, and 3-(dibutylamino)propylamine; unsaturated alkylamines such as allylamine; and aromatic amines such as benzylamine, phenethylamine, and xylylenediamine.

Examples of the secondary amine include aliphatic monoamines such as dimethylamine, diethylamine, dipropylamine, diisopropylamine, dibutylamine, dipentylamine, dihexylamine, and dicyclohexylamine; aromatic monoamines such as diphenylamine and dibenzylamine; benzylamines such as N-methylbenzylamine, N-ethylbenzylamine, N-butylbenzylamine, N-pentylbenzylamine, and N-hexylbenzylamine; cyclic amines such as pyrrolidine, methylpyrrolidine, piperidine, methylpiperidine, piperazine, and morpholine.

Examples of the cyclic tertiery amine include N-methylpyrrolidine, N-ethylpyrrolidine, N-methylpiperidine, N-methylmorpholine, quinuclidine, diazabicycloundecene, and diazabicyclononene. Among tertiary amines, these tertiary amines can be used, since these amines have relatively strong basicity attributed to a cyclic structure, whereby possible gelling of silica during heating performed in subsequent step (B) can be prevented.

Among the aforementioned bases, ammonia and water-soluble amines are preferred, with low-boiling-point amines having a boiling point of 120° C. or lower being more preferred. Among such low-boiling-point amines, ammonia, methylamine, dimethylamine, ethylamine, diethylamine, propylamine, dipropylamine, isopropylamine, and diisopropylamine are particularly preferred. Since these bases have a relatively low boiling point (e.g., about 120° C. or lower), they can be readily removed through distillation or the like. Thus, impairment in purity of the sol, which would otherwise be caused by such amines remaining in the aqueous dispersion, can be generally prevented.

The aforementioned bases may be used singly or in combination of two or more species. So long as the gist of the present invention is not changed, the mode of mixing base(s) as well as the mole ratio of the total amount of added base(s) to the amount of silicon originating from the alkoxysilane (base/$SiO_2$) may be appropriately modified.

The present embodiment further includes a step (B) of subjecting the aqueous dispersion of silica obtained in step (A) to a hydrothermal treatment at 150 to 350° C.

Through the hydrothermal treatment performed at a temperature falling within the above range, solubility of silicic acid present in the reaction system is enhanced, to thereby promote dissolution of silicic acid on the surfaces of the particles and deposition on particles serving as nuclei. As a result, silica particles can be grown. In the treatment, bonding of dissolved silicic acid to nuclei particles occurs at high temperature, whereby high concentration can be attained, and the amounts of silanol groups remaining inside the particles can be reduced. Thus, high-density silica particles can be formed. Therefore, the temperature of the aqueous dispersion is 150 to 350° C., preferably 170 to 350° C., more preferably 190 to 350° C. Notably, as stated in requirement (b), the density of the silica particles is assessed by the moisture absorption at 50% relative humidity or the refractive index as determined through the liquid immersion method.

The time for the hydrothermal treatment of the aqueous dispersion within the aforementioned temperature range varies depending on the treatment temperature. However, the higher the treatment temperature, the shorter the time for yielding the target silica particles.

No particular limitation is imposed on the apparatus for conducting the hydrothermal treatment. So long as the apparatus does not impair the density, moisture absorption resistance, and purity of the silica particles, any known apparatus may be employed.

As described above, the silica particle production method of the present embodiment enables production of an alkoxysilane serving as a raw material which is advantageous for readily forming high-purity silica particles, and high-purity silica particles having high density and excellent moisture absorption resistance. Through use of the thus-produced silica particles, a high-purity silica sol having high density and excellent moisture absorption resistance can also be yielded.

Next will be described, in more detail, one specific example of the method of the present embodiment for producing silica particles.

In step (A), an alkoxysilane is hydrolyzed to thereby form an aqueous dispersion of silica particles having a mean primary particle size of 3 to 20 nm. Through hydrolysis of alkoxysilane in a basic, aqueous medium or a hydrophilic organic solvent containing water, such an aqueous dispersion of silica particles is formed. If required, by-produced alcohol, an excess amount of organic solvent, a basic catalyst, etc. are removed.

Examples of the water which may be employed in the aqueous medium include pure water and ultra-pure water such as ion-exchange water, ultrafiltrated water, reverse osmotic water, and distilled water. When a high-purity silica sol which can be used for producing electronic materials is produced, pure water or ultrapure water having very low impurity level is suitably used. However, so long as the gist of the present invention is not changed, no particular limitation is imposed on the water, and it may contain a variety of additives or a hydrophilic organic solvent.

Examples of the hydrophilic organic solvent include methanol, ethanol, propanol, isopropanol, butanol, isobutanol, ethylene glycol, acetonitrile, dimethyl sulfoxide, dimethylformamide, dimethylacetamide, acetone, tetrahydrofuran, and diethylene glycol. However, no particular limitation is imposed on the organic solvent, and these hydrophilic organic solvents may be used singly or in combination of two or more species. Among these solvents, methanol, ethanol, propanol, and acetone are preferred, since these solvents have a low boiling point and can be readily removed in a subsequent step.

From the viewpoints of solubility in solvent, availability, etc., the alkoxysilane which may be employed in the invention is an alkyl ester of silicic acid monomer or a silicic acid oligomer having a polymerization degree of 2 to 3 and having a C1 or C2 alkyl group. Examples of preferably employed alkoxysilanes include tetramethyl silicate (TMOS), tetraethyl silicate (TEOS), methyl triethyl silicate, dimethyl diethyl silicate, trimethyl ethyl silicate, and a trialkyl silicate having a C1 or C2 alkyl group. These alkoxysilanes may be used singly or in combination of two or more species. Notably, a mixed ester having different alkyl groups in the molecule thereof, or a mixture of such mixed esters may also be used as the alkoxysilane.

The basic catalyst is preferably ammonia, a primary amine, or a secondary amine, with ammonia or an amine having a boiling point of 100° C. or lower being more preferred. After hydrolysis, the silica sol dispersion may be concentrated through a known technique such as distillation or ultrafiltration. In this case, the base employed as a catalyst and alcohol formed during the hydrolysis reaction can be partially or totally removed.

Thus, the silica sol produced through hydrolysis of alkoxysilane has a relatively small particle size, specifically a mean primary particle size, derived from a specific surface area as determined through the nitrogen adsorption method, of 3 to 20 nm, and is employed in this embodiment. In subsequent step (B), the surface areas increase, to thereby enhance the dissolution/deposition property, leading to effective growth of silica particles. In addition, undissolved large particles do not remain to serve as nuclei, and particle growth is prevented around the remaining large nuclei. As a result, silica particles having high density from surface to inside can be yielded.

Preferably, before carrying out the hydrothermal treatment in step (B), the amount of at least one base selected from the group consisting of ammonia, a primary amine, a secondary amine, and a cyclic tertiary amine in the aqueous dispersion of silica particles having a mean primary particle size of 3 to 20 nm is adjusted to 0.002 to 0.20 as a mole ratio (base/$SiO_2$).

The preferred mole ratio (base/$SiO_2$) varies depending on the type of base used. In the case where ammonia is used, the mole ratio (base/$SiO_2$) preferably falls within a range of 0.005 to 0.20.

When a primary amine (e.g., propylamine) or a secondary amine (e.g., diisopropylamine) is used as a base, the mole ratio (base/$SiO_2$) preferably falls within a range of 0.002 to 0.10.

When the mole ratio (base/$SiO_2$) is smaller than the lower limit of the corresponding range, difficulty is encountered in silica particle growth due to reduced solubility of silica. As a result, formation of dense silica particles is impeded. Also, when a portion of silica is dissolved during heating to thereby lower the pH of the silica sol, unstable conditions are provided. In such a case, the entirety of the silica sol may become a corresponding gel, or a part of the silica particles form a gel product via inter-particle fusion. In contrast, when the mole ratio (base/$SiO_2$) is greater than the upper limit of the corresponding range, inter-particle fusion or the like tends to occur due to excessively high solubility of silica in the system. Also, removal of unnecessary base from silica particles and the aqueous dispersion may be cumbersome.

In the case where ammonia is used as a base, the base amount; i.e., the mole ratio (base/$SiO_2$), more preferably falls within a range of 0.009 to 0.20. When a primary amine (e.g., propylamine) or a secondary amine (e.g., diisopropylamine) is used as a base, the mole ratio (base/$SiO_2$) more preferably falls within a range of 0.006 to 0.10. Under the above conditions, spherical particles are formed, and such particles are useful for a nano-filler, which can be incorporated in a large amount into a resin or the like.

Figure 1:
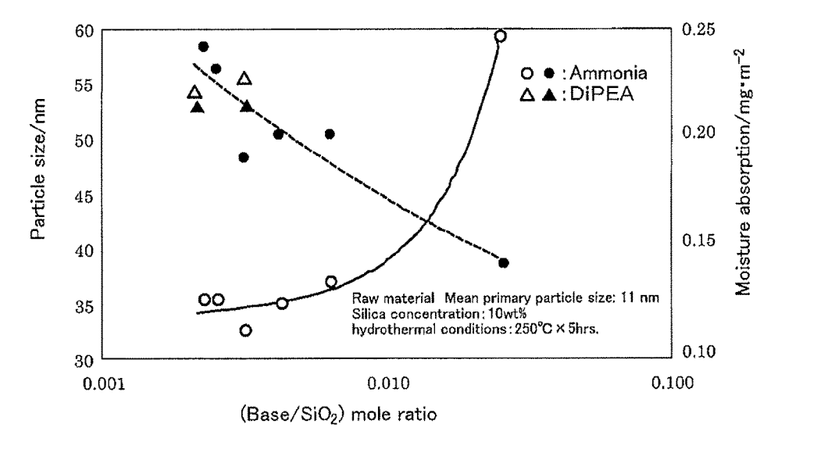
FIG. 1 A graph showing relationships between properties of silica particles and the species and amount of base.

Here, with reference to FIG. 1, relationships between properties of silica particles and the species and amount of base added to the medium, under given conditions, will be described. FIG. 1 is a graph showing the relationship between mole ratio (base/$SiO_2$) and mean primary particle size of the produced silica particles, and the relationship between mole ratio (base/$SiO_2$) and the moisture absorption amount at 50% relative humidity of the produced silica particles.

FIG. 1 shows a case in which a silica particle raw material had a mean primary particle size of 11 nm; the silica particle concentration of the aqueous dispersion was 10 mass %, the hydrothermal treatment temperature of the aqueous dispersion was 250° C., and the hydrothermal treatment time was 5 hours, under given conditions.

In FIG. 1, the solid line shows the relationship between the mean primary particle size of the produced silica particles and the mole ratio (base/$SiO_2$) in variation. The dotted line shows the relationship between the moisture absorption at 50% relative humidity of the produced silica particles and the mole ratio (base/$SiO_2$) in variation. The plotted circles show the case in which ammonia was used as a base, whereas the triangles show the case in which a secondary amine (e.g., diisopropylamine) was used as a base.

As shown by the solid line, in the case where ammonia was used, when the mole ratio (base/$SiO_2$) increased, the mean primary particle size of the produced silica particles increased, and the moisture absorption at 50% relative humidity decreased. The reason for this is that the dissolution/deposition of silica particles can be suitably promoted, as the mole ratio (base/$SiO_2$) increases.

As shown in this embodiment, high-purity silica particles having high density and excellent moisture absorption resistance can be produced by use of a weak base (e.g., ammonia) through modifying the mean primary particle size and other properties of silica particles.

Also, as shown by the dotted line, in the case where a secondary amine such as diisopropylamine was used, silica particles having large particle size were obtained even at a small mole ratio (base/$SiO_2$), as compared with the case where ammonia was used (denoted by the solid line). This is because, since a secondary amine such as diisopropylamine is generally a stronger base than ammonia, the amine promotes dissolution of silica particles in the medium, to thereby promote dissolution/deposition performance.

During the hydrothermal treatment, the medium may be stirred in accordance with needs. The aforementioned base remains in the medium in which silica particles are formed, and active silicic acid is dissolved in the medium. Thus, in this embodiment, the base may be partially removed from the medium. Through removal of the base, the pH of the medium can be lowered, whereby active silicic acid remaining in the medium can be deposited on the surfaces of silica particles. As a result, the active silicic acid level can be lowered, to thereby prevent deterioration in stability and other properties of the aqueous dispersion of silica particles.

No particular limitation is imposed on the method of removing base, and distillation, ion exchange, ultrafiltration, etc. may be employed. Among them, a technique in which the medium is heated to evaporate the base at a temperature equal to or higher than the boiling temperature of the medium is preferred. Through such a technique, the entirety or a part of the base can be reliably removed from the medium.

EXAMPLES

The present invention will next be described in more detail by way of examples, which should not be construed as limiting the invention thereto.

Production of Silica Sol

Production Example 1

Raw material silica sol [1] was produced through the following procedure. Specifically, to a 3-L stainless steel reactor equipped with a stirrer and a condenser, pure water (2,244 g) and 28-mass % aqueous ammonia (3.4 g) were added, and the contents of the reactor were maintained at 80° C. by means of an oil bath. Subsequently, a commercial product of tetramethyl silicate (TMOS) (253 g) was continuously added to the liquid in the reactor over 1.8 hours under stirring. After completion of feeding, the contents were continuously stirred for 1 hour while the reactor inside temperature was maintained at 80° C., and then heated to 90° C. Stirring was continued at 90° C. for 1 hour, to thereby provide a dispersion of silica particles. Then, the condenser was replaced by a side-arm tube, and a condenser was attached to an open end of the tube. The reaction mixture was heated to a boiling temperature of the contents, to thereby evaporate the liquid in the container. Through removal of the vapor to the outside, the contents were concentrated until the liquid temperature was adjusted to 99° C.

Subsequently, the entirety of the liquid in the reactor was removed from the reactor, and the recovered liquid was concentrated by means of a rotary evaporator to 970 g under a reduced pressure of 100 Torr, to thereby yield a silica sol having an $SiO_2$ concentration of 10.2 mass %, a pH of 7.5, an ammonia concentration, as determined through acid titration, of 0.001 mass %, a particle size, as determined through dynamic light scattering, of 10.8 nm, and a mean primary particle size derived from a specific surface area as determined through the nitrogen adsorption method (hereinafter referred to as a "BET method particle size") of 10 nm. The silica sol was dried, to thereby provide a silica powder having a moisture absorption amount per surface area of 0.42 mg/m² and a particle refractive index of 1.447.

Production Example 2

Raw material silica sol [2] was produced through the following procedure. Specifically, pure water (2,244 g) and 28-mass % aqueous ammonia (3.4 g) were placed in the same reactor as employed in Production Example 1, and the contents of the reactor were maintained at 80° C. by means of an oil bath. Subsequently, under stirring, a commercial product of tetramethyl silicate (TMOS) (253 g) was continuously added to the liquid over 0.9 hours. After completion of feeding, the contents were continuously stirred for 1 hour while the reactor inside temperature was maintained at 80° C., and then heated to 90° C. Stirring was continued at 90° C. for 1 hour, to thereby provide a dispersion of silica particles.

Subsequently, similar to Production Example 1, the liquid in the reactor was evaporated to the outside, to thereby concentrate the contents to a liquid temperature of 99° C. Then, the entirety of the contents was recovered from the reactor and further concentrated to 970 g by means of a rotary evaporator under a reduced pressure of 100 Torr, to thereby yield a silica sol having an $SiO_2$ concentration of 10.2 mass %, a pH of 7.4, an ammonia concentration, as determined through acid titration, of 0.0075 mass %, a dynamic light scattering particle size of 15 nm, and a BET method particle size of 11 nm. The silica sol was dried, to thereby provide a silica powder having a moisture absorption amount per unit surface area of 0.43 mg/m² and a silica particle refractive index of 1.446.

Production Example 3

Raw material silica sol [3] was produced through the following procedure. Specifically, pure water (2,214 g) and 28-mass % aqueous ammonia (25.3 g) were placed in the same reactor as employed in Production Example 1, and the contents of the reactor were maintained at 80° C. by means of an oil bath. Subsequently, under stirring, a commercial product of tetraethyl silicate (TEOS) (260.5 g) was continuously added dropwise to the liquid over 3 hours. After completion of feeding, the contents were continuously stirred for 1 hour while the reactor inside temperature was maintained at 80° C., and then heated to 90° C. Stirring was continued at 90° C. for 1 hour, to thereby provide a dispersion of silica particles.

Subsequently, similar to Production Example 1, the liquid in the reactor was evaporated to the outside, to thereby concentrate the contents to a liquid temperature of 99° C. Then, the entirety of the contents was recovered from the reactor and further concentrated to 980 g by means of a rotary evaporator under a reduced pressure of 100 Torr, to thereby yield a silica sol having an $SiO_2$ concentration of 10 mass %, a pH of 7.8, a residual ammonia concentration, as determined through acid titration, of 0.0068 mass %, a dynamic light scattering particle size of 23 nm, and a BET method particle size of 16 nm. The silica sol was dried, to thereby provide a silica powder having a moisture absorption amount per unit surface area of 0.21 mg/m² and a silica particle refractive index of 1.446.

Production Example 4

Raw material silica sol [4] was produced through the following procedure. Specifically, pure water (2,229 g) and 28-mass % aqueous ammonia (10.1 g) were placed in the same reactor as employed in Production Example 1, and the contents of the reactor were maintained at 90° C. by means of an oil bath. Subsequently, under stirring, a commercial product of tetraethyl silicate (TEOS) (260.5 g) was continuously added dropwise to the liquid over 2.5 hours. After completion of feeding, the contents were continuously stirred for 2 hours while the reactor inside temperature was maintained at 90° C., to thereby provide a dispersion of silica particles. Subsequently, similar to Production Example 1, the liquid in the reactor was evaporated to the outside, to thereby concentrate the contents to a liquid temperature of 99° C.

Then, the entirety of the contents was recovered from the reactor and further concentrated to 980 g by means of a rotary evaporator under a reduced pressure of 100 Torr, to thereby yield a silica sol having an $SiO_2$ concentration of 10 mass %, a pH of 7.7, an ammonia concentration, as determined through acid titration, of 0.0049 mass %, a dynamic light scattering particle size of 26.7 nm, and a BET method particle size of 19 nm.

[Raw Material Silica Sol 5]

A commercial silica sol ("Quartron (registered trademark) PL-06L," product of Fuso Chemical Co., Ltd.), having an $SiO_2$ concentration of 6.3 mass %, a pH of 7.5, an ammonia concentration, as determined through acid titration, of 0.0054 mass %, and a BET method particle size of 8 nm, was used. The commercial silica sol was dried, to thereby provide a silica powder having a moisture absorption amount per unit surface area of 0.48 mg/m$^2$ and a silica particle refractive index of 1.440.

[Raw Material Silica Sol 6]

A commercial silica sol ("Quartron (registered trademark) PL-3," product of Fuso Chemical Co., Ltd.), having an $SiO_2$ concentration of 19.5 mass %, a pH of 7.3, an ammonia concentration, as determined through acid titration, of 0.0026 mass %, and a BET method particle size of 35 nm, was used. The commercial silica sol was dried, to thereby provide a silica powder having a moisture absorption amount per unit surface area of the 1.08 mg/m$^2$ and a silica particle refractive index of 1.390.

Example 1

To the silica sol produced in Production Example 1 (raw material silica sol [1]) (180 g) ($SiO_2$ concentration: 10.2 mass %, and BET method particle size: 10 nm), 25% aqueous ammonia (0.253 g) was added under sufficient stirring, so as to adjust the mole ratio (total amount of base added)/(silica) to 0.0125, to thereby yield a liquid mixture. The "total amount of added base" refers to the sum of the amount of ammonia remaining in the raw material silica sol and the amount of newly added base species. Then, the liquid mixture was placed in an autoclave having a capacity of 300 mL and made of stainless steel and heated by means of a dryer to 250° C. The mixture was maintained for 5 hours at 250° C. and then cooled to room temperature. The contents were removed from the autoclave, to thereby obtain a silica sol. The sol was found to have a dynamic light scattering particle size of 49.5 nm and a BET method particle size of 32 nm. The thus-obtained silica sol was dried, to thereby provide a silica powder having a moisture absorption amount per unit surface area of 0.19 mg/m$^2$ and a silica particle refractive index of 1.454. The silica particles were found to have a sodium content of 1 ppm.

Examples 2 to 13

Through the same procedure and the apparatus as employed in Example 1, except that the BET particle size, the base, the mole ratio, the autoclave treatment temperature, etc. were changed to values shown in Table 1, silica sols were produced. The silica particles forming each silica sol were assessed.

Comparative Example 1

The autoclave treatment was conducted through the same method and apparatus as employed in Example 1, except that triethylamine (0.306 g) was added as a base. However, gelation occurred, thereby failing to form a silica sol. No assessment was conducted for silica particles.

Comparative Example 2

The autoclave treatment was conducted through the same method and apparatus as employed in Example 1, except that 35% tetramethylammonium hydroxide (1.562 g) was added as a base. However, gelation occurred, thereby failing to form a silica sol. No assessment was conducted for silica particles.

Comparative Example 3

Through the same procedure and the apparatus as employed in Example 1, except that 10% aqueous sodium hydroxide (0.609 g) was added as a base so as to adjust the mole ratio (total amount of base added)/(silica) to 0.0053, a silica sol was produced. The thus-obtained silica sol was dried, to thereby provide a silica powder having a moisture absorption amount per unit surface area of 0.14 mg/m$^2$ and a silica particle refractive index of 1.456. The thus-obtained silica sol was subjected to cation exchange, and then the silica particles were found to have a sodium content of 80 ppm as a metallic impurity. Thus, when sodium species was used, sodium was incorporated into the silica particles during growth thereof, whereby high-purity silica particles fail to be formed.

Comparative Example 4

Through the same procedure and the apparatus as employed in Example 1, except that the $SiO_2$ concentration of raw material silica sol [6] was adjusted to 10 mass %, and 25% aqueous ammonia was added in an amount of 0.236 g, a silica sol was produced. The thus-obtained silica sol was dried, to thereby provide a silica powder having a moisture absorption amount per unit surface area of 0.50 mg/m$^2$ and a silica particle refractive index of 1.390. The moisture absorption amount was not suppressed to a satisfactory level, and densification was incomplete inside the particles.

[Mean Primary Particle Size Determined by Nitrogen Adsorption Method (BET Method)]

The raw material silica particles employed as raw materials in the Examples and Comparative Examples, and the silica particles produced in the Examples and Comparative Examples were evaluated in terms of mean primary particle size through the following procedure based on the nitrogen adsorption method (BET method). In a specific procedure, each silica sol was subjected to cation exchange, to thereby remove base. The product was dried in a vacuum dryer at 80° C., to thereby form a silica gel. The dry gel was pulverized by means of a mortar, and the resultant powder was further dried at 180° C. for 3 hours, to thereby form a dry silica powder. The specific surface area (m$^2$/g) of the powder was determined through a nitrogen absorption method, and the mean primary particle size was determined by the following formula (1). The measurement was conducted by means of Monosorb (product of Quantachrome Corporation). As described above, in Comparative Examples 1 and 2, gelation of silica particles was observed. As a result, mean primary particle size could not be calculated.

[F1]

$$\text{Mean primary particle size} = 2{,}720/\text{specific surface area (m}^2/\text{g)} \quad (1)$$

[Particle Size Determined Through Dynamic Light Scattering Method]

The particle size was measured through a conventional method by means of a dynamic light scattering measuring apparatus (Zetasizer Nano (product of Malvern Instruments Ltd.)).

[Moisture Absorption at 50% Relative Humidity]

The hygroscopic property (moisture absorbing property) of each of the silica particle samples produced in the Examples and Comparative Examples was determined through the following procedure. Specifically, the same dry powder (dried at 180° C.) as employed in the specific surface area measurement was sampled (0.2 g) into a weighing bottle, and the weight of the entirety was measured. The bottle was allowed to stand in an atmosphere at 23° C. and an RH of 50% for 48 hours, while the bottle remained open. The bottle was closed, and the weight of the entirety was measured again. The moisture absorption amount per unit surface area was calculated, on the basis of a BET method specific surface area, through the following equation (2):

[F2]

$$\text{Moisture absorption amount (mg/m}^2\text{)} = \text{increase in weight (mg)} / (\text{amount of sample (g)} \times \text{specific surface area (m}^2\text{/g)}) \quad (2)$$

[Refractive Index]

The refractive index of each of the silica particle samples produced in the Examples and Comparative Examples (i.e., Examples 1 to 13 and Comparative Examples 1 to 4) and forming silica sols was determined through the following procedure. Specifically, the same dry powder as employed in the specific surface area measurement was sampled (0.1 g) into a glass bottle (10 cc). To the bottle, 2-propanol (special grade) and toluene (special grade) were added at a varied compositional proportion. When the powder in the bottle came to have transparent appearance, the refractive index of the supernatant was determined by means of an Abbe's refractometer, to thereby determine the refractive index of the silica particle sample.

[Alkali Metal Element Content]

The alkali metal element content of the silica particle sample of Example 1 of the present invention and that of the silica particle sample of Comparative Example 3, employing sodium hydroxide (NaOH) serving as an alkali metal element-containing strong base, were determined through the following procedure. Each of the silica sols of Example 1 and Comparative Example 3 was dissolved in a platinum plate with dilute nitric acid and fluoric acid and dried to solid. Then, dilute nitric acid was added to the solid, to thereby prepare an aqueous solution. The sodium content of the solution was determined through atomic absorption spectrometry.

[Morphology of Silica Particles after Hydrothermal Treatment]

The silica particle samples produced in the Examples and Comparative Examples were analyzed in terms of morphology by transmission electron microscopic photoimages through the following procedure. Specifically, the longer diameter $D_L$ (the longest size of a particle) and the shorter diameter $D_S$ (the longest line orthogonal to the line corresponding to the longer diameter) were determined, and the ratio ($D_L/D_S$) was employed as an aspect ratio. About 300 particles were evaluated, and the obtained aspect ratios were arithmetically averaged.

TABLE 1

| | | Ex. 1 | Ex. 2 | Ex. 3 | Ex. 4 | Ex. 5 | Ex. 6 |
|---|---|---|---|---|---|---|---|
| | Raw material silica | [1] | [1] | [2] | [5] | [5] | [3] |
| Raw material aqueous sol | $SiO_2$ concn. (mass %) | 10.2 | 10.2 | 10.2 | 6.3 | 6.3 | 10 |
| | BET particle size (nm) | 10 | 10 | 11 | 8 | 8 | 16 |
| | $NH_3$ (mass %) | 0.001 | 0.001 | 0.0075 | 0.0054 | 0.0054 | 0.0068 |
| Hydrothermal conditions | Base | 25% aq. $NH_3$ | n-Pr amine | Di-isoPr amine | Diazabicyclo undecene | Di-isoPr amine | Di-isoPr amine |
| | (Base amount/$SiO_2$) mole ratio | 0.0125 | 0.0125 | 0.0125 | 0.0067 | 0.0125 | 0.0125 |
| | Base amount (g) | 0.253 | 0.220 | 0.306 | 0.105 | 0.181 | 0.306 |
| | Hydrothermal temp. (° C.) | 250 | 250 | 250 | 250 | 250 | 250 |
| Aq. sol after hydrothermal treatment | BET particle size (nm) | 32.3 | 43.5 | 55.3 | 36.5 | 34 | 28 |
| | Dynamic light scattering particle size (nm) | 50.2 | 65.2 | 70.3 | 48.7 | 48.2 | 38.07 |
| | Moisture absorption per surface area (mg/m$^2$) | 0.19 | 0.16 | 0.20 | 0.17 | 0.16 | 0.19 |
| | Refractive index | 1.454 | 1.454 | 1.455 | 1.455 | 1.454 | 1.452 |
| | Aspect ratio | 1.3 | 1.1 | 1.0 | 1.1 | 1.7 | 1.1 |
| | Na:$SiO_2$ (ppm) | 1 | — | — | — | — | — |

TABLE 2

| | | Ex. 7 | Ex. 8 | Ex. 9 | Ex. 10 | Ex. 11 | Ex. 12 | Ex. 13 |
|---|---|---|---|---|---|---|---|---|
| | Raw material silica | [4] | [2] | [2] | [1] | [1] | [2] | [2] |
| Raw material aqueous sol | $SiO_2$ concn. (mass %) | 10 | 10.2 | 10.2 | 10.2 | 10.2 | 10.2 | 10.2 |
| | BET particle size (nm) | 19 | 11 | 11 | 10 | 10 | 11 | 11 |
| | $NH_3$ (mass %) | 0.0049 | 0.0075 | 0.0075 | 0.001 | 0.001 | 0.0075 | 0.0075 |
| Hydrothermal conditions | Base | Di-isoPr amine | Di-isoPr amine | 25% aq. $NH_3$ | 25% aq. $NH_3$ | 25% aq. $NH_3$ | Di-isoPr amine | Di-isoPr amine |
| | (Base amount/$SiO_2$) mole ratio | 0.0125 | 0.0125 | 0.1 | 0.017 | 0.00909 | 0.00667 | 0.005 |
| | Base amount (g) | 0.326 | 0.306 | 0.465 | 0.346 | 0.0107 | 0.102 | 0.0500 |
| | Hydrothermal temp. (° C.) | 250 | 200 | 250 | 250 | 250 | 250 | 250 |
| Aq. sol after hydrothermal treatment | BET particle size (nm) | 28 | 49 | 59 | 35 | 35 | 35 | 35 |
| | Dynamic light scattering particle size (nm) | 36.2 | 39.9 | 80.8 | 50.3 | 55.8 | 49.3 | 58.7 |
| | Moisture absorption per surface area (mg/m$^2$) | 0.19 | 0.23 | 0.14 | 0.23 | 0.24 | 0.22 | 0.21 |

TABLE 2-continued

|  | Ex. 7 | Ex. 8 | Ex. 9 | Ex. 10 | Ex. 11 | Ex. 12 | Ex. 13 |
| --- | --- | --- | --- | --- | --- | --- | --- |
| Refractive index | 1.451 | 1.455 | 1.454 | 1.455 | 1.454 | 1.454 | 1.454 |
| Aspect ratio | 1.1 | 1.1 | 1.3 | 1.2 | 2.0 | 1.8 | 3.5 |
| Na:SiO$_2$ (ppm) | — | — | — | — | — | — | — |

TABLE 3

|  |  | Comp. Ex. 1 | Comp. Ex. 2 | Comp. Ex. 3 | Comp. Ex. 4 |
| --- | --- | --- | --- | --- | --- |
|  | Raw material silica | [1] | [1] | [1] | [6] |
| Raw material sol | SiO$_2$ concn. (mass %) | 10.2 | 10.2 | 10.2 | 19.5 |
|  | BET particle size (nm) | 10 | 10 | 10 | 35 |
|  | NH$_3$ (mass %) | 0.001 | 0.001 | 0.001 | 0.0026 |
| Hydrothermal conditions | Base | Tri-Et amine | TMAH | 10% NaOH | 25% aq. NH$_3$ |
|  | (Base amount/SiO$_2$) mole ratio | 0.0125 | 0.0125 | 0.0053 | 0.0125 |
|  | Base amount (g) | 0.306 | 1.562 | 0.609 | 0.236 |
|  | Hydrothermal temp. (° C.) | 250 | 250 | 250 | 250 |
| Aq. sol after hydrothermal treatment | BET particle size (nm) | Gel formation | Gel formation | 65 | 45 |
|  | Dynamic light scattering particle size (nm) |  |  | 88.4 | 71.3 |
|  | Moisture absorption per surface area (mg/m$^2$) |  |  | 0.14 | 0.50 |
|  | Refractive index |  |  | 1.456 | 1.390 |
|  | Na:SiO$_2$ (ppm) |  |  | 80 | — |

As is clear from Tables 1 to 3, gelling of silica particles was observed in Comparative Example 1 (employing a tertiary amine other than a specific cyclic tertiary amine) and in Comparative Example 2 (employing a quaternary ammonium). In Comparative Example 3, where sodium hydroxide (NaOH) was used as an alkali metal element-containing strong base, the alkali metal element content, with respect to the silica solid content, was about 80 ppm. Thus, high-purity silica particles failed to be produced.

Also, as is clear from Tables 1 to 3, the refractive index was relatively small in Comparative Example 4, in which no hydrothermal treatment was conducted. In this case, the produced silica particles were found to have a density lower than that attained in Examples 1 to 13.

In contrast, the silica particle samples of Examples 1 to 13 were obtained through the method including the aforementioned steps (A) and (B). Thus, the method of the present invention has been proven to yield high-purity silica particles and silica sol, which have high density and excellent moisture absorption resistance.

The invention claimed is:

1. Silica particles, formed from an alkoxysilane serving as a raw material, wherein the silica particles:
   have an alkali metal element content of 5 ppm or less, with respect to the silica solid content;
   exhibit a moisture absorption of 0.25 mg/m$^2$ or less at 50% relative humidity, and a refractive index, as determined through the liquid immersion method, of 1.450 to 1.460; and
   have a mean primary particle size, derived from a specific surface area as determined through the nitrogen adsorption method, of 10 to 100 nm wherein the moisture absorption is an amount calculated per unit surface area, through the following equation:

moisture absorption (mg/m$^2$)=(increase in weight (mg))/(amount of sample (g)×specific surface are of the sample (m$^2$/g))

where the increase in weight is determined by introducing the amount of sample into a bottle and obtaining an initial weight of the bottle containing the sample, and subtracting the initial weight from a final weight that is obtained after allowing the bottle to stand in an atmosphere at 23° C. and a relative humidity of 50% for 48 hours, while the bottle remains open.

2. Silica particles according to claim 1, wherein the silica particles have an aspect ratio, as determined from a transmission electron microscopic photoimage, of 1.0 to 2.0.

3. A silica sol containing silica particles as recited in claim 1.

4. A silica sol containing silica particles as recited in claim 2.

5. The silica particles according to claim 1, wherein the moisture absorption is in a range of from of 0.14 mg/m$^2$ to 0.24 mg/m$^2$.

6. A method for producing the silica particles of claim 1, wherein the method comprising the following steps (A) and (B):
   (A) a step of hydrolyzing an alkoxysilane in the co-presence of at least one base selected from the group consisting of ammonia, a primary amine, a secondary amine, and a cyclic tertiary amine, to thereby form an aqueous dispersion of silica particles having a mean primary particle size, derived from a specific surface area as determined through the nitrogen adsorption method, of 3 to 20 nm; and
   (B) a step of subjecting the aqueous dispersion of silica particles to a hydrothermal treatment at 150 to 350° C.

7. A method for producing silica particles according to claim 6, wherein, before carrying out the hydrothermal treatment in step (B), the amount of at least one base selected from the group consisting of ammonia, a primary amine, a secondary amine, and a cyclic tertiary amine in the aqueous dispersion of silica particles having a mean primary particle size of 3 to 20 nm is adjusted to 0.002 to 0.20 as a mole ratio (base/$SiO_2$).

* * * * *